United States Patent [19]

Bugajski et al.

[11] Patent Number: 5,362,692
[45] Date of Patent: Nov. 8, 1994

[54] FREE-FLOWING REFRACTORY CASTING SLIP

[75] Inventors: Matgorzata Bugajski, Radenthein, Austria; Margit Hösler, Urmitz, Germany; Günther Mörtl, Villach, Austria

[73] Assignee: Radex-Heraklith Industriebeteiligungs Aktiengesellschaft, Vienna, Austria

[21] Appl. No.: 923,312

[22] Filed: Jul. 31, 1992

[30] Foreign Application Priority Data

Aug. 1, 1991 [DE] Germany .................. 4125511

[51] Int. Cl.$^5$ ........................... C04B 35/48
[52] U.S. Cl. ............................ 501/103; 501/105; 501/127; 501/132
[58] Field of Search .............. 264/86; 501/105, 126, 501/127, 153, 132, 102, 103

[56] References Cited

U.S. PATENT DOCUMENTS

| | | | |
|---|---|---|---|
| 4,077,808 | 3/1978 | Church et al. | 106/40 R |
| 4,330,630 | 5/1982 | Jeanviome et al. | 501/105 |
| 4,737,326 | 4/1988 | Wirth et al. | 264/56 |
| 4,792,538 | 12/1988 | Paulica et al. | 501/127 |
| 4,810,442 | 3/1989 | Hillig et al. | 264/66 |
| 4,935,178 | 6/1990 | Esposito et al. | 264/56 |
| 5,053,366 | 10/1991 | Schoennabel | 501/127 |
| 5,106,795 | 4/1992 | Draks et al. | 501/126 |

*Primary Examiner*—Mark L. Bell
*Assistant Examiner*—A. Wright
*Attorney, Agent, or Firm*—John F. A. Earley; John F. A. Earley, III

[57] ABSTRACT

The present invention pertains to a refractory casting slip consisting of a refractory matrix material and a finely divided reactive component, as well as a hydraulic binder and various additives, which can be discharged as a free-flowing mass upon addition of water.

18 Claims, No Drawings

FREE-FLOWING REFRACTORY CASTING SLIP

The present invention pertains to a free-flowing refractory casting slip. The term casting slip is defined as a dry mortar which can be made into a casting slip with water, unless otherwise specified or recognizable from the context.

Casting slips are defined as refractory masses which can be processed by casting in molds. These masses are usually thixotropic. This applies especially to so-called vibration masses. Such a vibration mass is described in EP 0,247,351 B1. When the vibration masses are used in the steel industry, e.g., in the blast furnace, tundish, ladle, cover, or in the discharge area, the mass is treated by means of pneumatic or electrical vibrators in order to reach the desired density and consequently better infiltration resistance to metallurgical melts.

The use of a horizontal electric vibrator requires expensive training of the personnel. Compaction with block vibrators requires heavy physical work on the part of the personnel. In addition, such compaction aids are not always available.

However, the use of such vibrators has the disadvantage that disturbing flow movements of the mass being vibrated frequently occur. These flow movements lead to inhomogeneities and air inclusions in the set mass.

To achieve complete filling of the molding board, especially when casting complicated parts, additional water is sometimes added to the vibration mass in order to eliminate, at least partially, the thixotropic properties of the mass, which are disturbing here. Experience has shown that this measure leads to a reduction in strength.

The present invention is to provide a refractory casting slip which flows freely after addition of water without mechanical compaction aids, i.e., without vibrators, and nevertheless reaches a density comparable to that of the vibration mass in the set state. In addition, the mass is to possess good strength values in the hardened state.

To achieve this, the present invention suggests a casting slip which has the composition described below and which flows freely without vibration aids after addition of 3.5 to 7.0 parts by weight of mixing water per 100 parts by weight of solids of the casting slip:

- 65 to 87 wt. % of a refractory matrix material based on $Al_2O_3$, $Zr_2O_3$, and/or $Cr_2O_3$, with a particle size of between 0.05 and 10.0 mm,
- 7.0 to 22.0 wt. % of a reactive refractory component based on $Al_2O_3$, $Zr_2O_3$, and/or $Cr_2O_3$, with a particle size of between 0.1 and 10 microns,
- 0.5 to 10.0 wt. % of a hydraulic binder containing more than 68 wt. % $Al_2O_3$, and
- 0.2 to 6.5 wt. % of one or several additives which stabilize the casting slip mixed with water and/or increase the water retention capacity of the casting slip.

The sum of the components (with the exception of the mixing water) is always 100 wt. %. This is also true if the mass contains further additives as described below.

Adjustment of the mixing water as well as of the said additives to the refractory matrix material and the reactive refractory component is decisive for the desired flow properties of the casting slip. This adjustment is to be done such that "bleeding," i.e., rejection of excess water, is prevented with certainty. The specific amount of mixing water, which is preferably set at an accuracy to ±0.1 parts by weight, can be determined empirically on the basis of the specific batch. Examples of batches will be described below.

Specific adjustment in the particle size range of the refractory matrix material and of the reactive refractory component is also decisive for the casting slip that flows without vibration. Both the qualitative and the quantitative compositions are adjusted to the mixing water content preferably such that the viscosity of the mass during casting will be as low as possible.

The refractory matrix material preferably consists of tabular alum earth (alumina), corundum, zirconium-aluminum melt corundum, chromium melt corundum, and/or bauxite. The refractory matrix material acts as a filler in relation to the said reactive refractory component in the mass. According to an advantageous embodiment, the minimum content of this filler is 73.0 wt. %.

The reactive refractory component, which also assumes a binder function, preferably consists of calcined alum earth or other, highly reactive refractory materials, such as micronized melt corundum.

In principle, the finer this component, the higher is its reactivity, and the easier it is to compact the finished casting slip without vibration.

The content of the reactive refractory component shall be between 7.0 and 22.0 wt. %, and a range of between 12.0 and 20.0 wt. % usually leads to good results.

According to an advantageous embodiment, the binder is provided as alum earth cement. Even 1.5 to 4.0 wt. % are sufficient for good and reliable binding, especially if the percentage of the micronized refractory component is correspondingly increased.

The rate of setting can be set as needed with a setting retardant, e.g., borax. Such a setting retardant is added to the casting slip in amounts of between 0.02 and 0.2 wt. %.

If shorter setting times are desired, suitable chemical accelerators may be added. However, it was found that the addition of 0.5 to 2.5 wt. % graphite has the same effect.

The flow properties of the casting slip are further improved by the said stabilizing additives and/or additives which increase the water retention capacity of the casting slip. Such additives lead to activation of the surface of the individual solid particles. Finely divided clay, especially kaolin or bentonite, and/or quartz powder have proven to be particularly advantageous. While the finely divided clay may be added in an amount of between 0.2 and 1.5 wt. %, the percentage of quartz powder is advantageously somewhat lower and is between 0.1 and 1.0 wt. %. Both additives should be introduced in a particle size of <1 micron. According to preliminary experiments, it seems as if the stabilization of the mixed casting slip by these agents were based on the filling of small pores between the cement and solid particles when the mass sets.

To improve the homogeneity of the casting slip, the addition of a dispersing agent in an amount of between 0.02 and 0.2 wt. % is furthermore suggested. Such dispersing agents are known per se, but for other masses. Examples of dispersing agents are sodium polyphosphate and/or sodium or ammonium salts of polyacrylates.

Depending on the specific application, the addition of a lubricant may also be advantageous for further improving the flow properties of the mass. The lubricants which can be used here include especially polyhydric alcohols. An amount of 0.1 to 1.0 wt. % already leads to an improvement in the flow properties of the casting slip.

In further embodiments, the casting slip may have the following features:

Oxalic acid may be used as the dispersing agent.
Citric acid maybe used as the setting retardant.
The preferred particle size range of the refractory reactive component is between 0.1 and 8.0 microns.

The present invention will be described below in greater detail on the basis of an exemplified embodiment.

The casting slip has the following composition:

| | |
|---|---|
| Melt corundum (0.05 to 10 mm) | 77.00 wt.% |
| Calcined alum earth (alumina) (0.4 to 8.0 microns) | 20.00 wt. % |
| Alum earth (alumina) cement (70.0 wt. % $Al_2O_3$) | 2.00 wt. % |
| Kaolin (<1 micron) | 0.55 wt. % |
| Quartz powder (<1 micron) | 0.30 wt. % |
| Sodium pre-polyphosphate | 0.05 wt. % |
| Borax | 0.05 wt. % |
| Oxalic acid | 0.05 wt. % |
| | 100.00 wt. % |

One hundred parts by weight of the mass are mixed homogeneously with 4.9 parts by weight of water.

The mass begins to set after ca. 60 minutes. Setting is complete after ca. 150 minutes.

The apparent density of the mass equals 3.30 g/cm$^3$, i.e., it reaches values which have hitherto been known for vibration masses only.

The apparent porosity is 14.5 vol. %.

The cold bending strength of the set mass was determined to be 3.8N/mm$^2$, and its cold compressive strength was found to be ca. 30N/mm$^2$.

We claim:

1. Refractory casting slip comprising
   (i) 65.0 to 87.0 wt. % of a refractory matrix material, the refractory matrix material including a substance selected from the group consisting of $Al_2O_3$, $Zr_2O_3$, $Cr_2O_3$, and a combination thereof, the refractory matrix material having a particle size of between 0.05 and 10.0 mm,
   (ii) 7.0 to 22.0 wt. % of a reactive refractory component, the reactive refractory component including a substance selected from the group consisting of $Al_2O_3$, $Zr_2O_3$, $Cr_2O_3$, and a combination thereof, the reactive refractory component having a particle size of between 0.1 and 10.0 microns,
   (iii) 0.5 to 10.0 wt. % of a hydraulic binder containing more than 68.0 wt. % $Al_2O_3$, and
   (iv) 0.2 to 6.5 wt. % of at least one additive which stabilizes the casting slip, or increases the water retention capacity of the casting slip,
   the casting slip being free-flowing upon addition of 3.5 to 7.0 parts by weight of mixing water per 100 parts by weight of solids.

2. Casting slip in accordance with claim 1, in which the refractory matrix material is tabular alumina, corundum, zirconium-aluminum melt corundum, chromium melt corundum, bauxite, or a combination thereof.

3. Casting slip in accordance with claim 1, containing 73.0 to 87.0 wt. % refractory matrix material.

4. Casting slip in accordance with claim 1, in which the reactive refractory component is calcined alumina, melt corundum, or a combination thereof.

5. Casting slip in accordance with claim 1, in which the reactive refractory component occurs in a particle fraction of between 0.1 and 8.0 microns.

6. Casting slip in accordance with claim 1, containing 12.0 to 20.0 wt. % reactive refractory component.

7. Casting slip in accordance with claim 1, in which the binder comprises alumina cement.

8. Casting slip in accordance with claim 1, in which the binder content is 1.5 to 4.0 wt. %.

9. Casting slip in accordance with claim 1, in which the additive comprises finely divided kaolin, quartz powder, or a combination thereof.

10. Casting slip in accordance with claim 1, in which the additive added in the solid form has a particle size of <1.0 micron.

11. Casting slip in accordance with claim 1, which additionally contains a setting retardant in an amount of between 0.02 and 0.2 wt. %.

12. Casting slip in accordance with claim 11, in which the setting retardant comprises borax, citric acid, or a combination thereof.

13. Casting slip in accordance with claim 1, which additionally contains graphite in an amount of 0.5 to 2.5 wt. %.

14. Casting slip in accordance with claim 1, which contains at least one dispersing agent in an amount of between 0.02 and 0.2 wt. %.

15. Casting slip in accordance with claim 14, in which the dispersing agent comprises a sodium polyphosphate, sodium or ammonium salt of a polyacrylate, oxalic acid, or a combination thereof.

16. Casting slip in accordance with claim 1, which contains a lubricant in an amount of between 0.1 and 1.0 wt. %.

17. Casting slip in accordance with claim 16, in which the lubricant consists of polyhydric alcohols.

18. Refractory casting slip comprising
   (i) 73.0 to 87.0 wt. % of a refractory matrix material, the refractory matrix material having a particle size of between 0.05 and 10.0 mm, the refractory matrix material consisting of tabular alumina, corundum, zirconium-aluminum melt corundum, chromium melt corundum, bauxite, or a combination thereof,
   (ii) 12.0 to 20.0 wt. % of a reactive refractory component, the reactive refractory component including a substance selected from the group consisting of $Al_2O_3$ $Zr_2O_3$, $Cr_2O_3$, and a combination thereof, the reactive refractory component having a particle size of between 0.1 and 10.0 microns, the reactive refractory component consisting of calcined alumina, melt corundum, or a combination thereof,
   (iii) 1.5 to 4.0 wt. % of a hydraulic binder containing more than 68.0 wt. % $Al_2O_3$, the binder consisting of alumina cement, and
   (iv) 0.2 to 6.5 wt. % of additives which stabilize the casting slip, or increase the water retention capacity of the casting slip, the additives added in solid form having a particle size of <1.0 micron, the additives including a finely divided kaolin, quartz powder, or a combination thereof, a setting retardant in an amount of between 0.02 and 0.2 wt. %, the setting retardant consisting of borax, citric acid, or a combination thereof, graphite in an amount of 0.5 to 2.5 wt. %, a dispersing agent in an amount of between 0.02 and 0.2 wt. %, the dispersing agent consisting of a sodium polyphosphate, a sodium or ammonium salt of a polyacrylate, an oxalic acid, or a combination thereof, and a lubricant in an amount of between 0.1 and 1.0 wt. %, the lubricant consisting of polyhydric alcohols, the casting slip being free-flowing upon addition of 3.5 to 7.0 parts by weight of mixing water per 100 parts by weight of solids.

* * * * *